US012454345B2

United States Patent
Walega et al.

(10) Patent No.: US 12,454,345 B2
(45) Date of Patent: Oct. 28, 2025

(54) SEAL

(71) Applicant: Airbus Operations Limited, Bristol (GB)

(72) Inventors: Janusz Walega, Bristol (GB); Paul Morrell, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 18/646,091

(22) Filed: Apr. 25, 2024

(65) Prior Publication Data
US 2024/0359792 A1 Oct. 31, 2024

(30) Foreign Application Priority Data

Apr. 27, 2023 (GB) ...................... 2306216

(51) Int. Cl.
*B64C 3/56* (2006.01)
*B64C 23/06* (2006.01)

(52) U.S. Cl.
CPC .............. *B64C 3/56* (2013.01); *B64C 23/072* (2017.05)

(58) Field of Classification Search
CPC .......... B64C 3/56; B64C 23/072; B64U 20/50
See application file for complete search history.

(56) References Cited

U.S. PATENT DOCUMENTS

| 10,870,480 | B2 | 12/2020 | Brakes |
| 2010/0000991 | A1 | 1/2010 | Henry et al. |
| 2017/0008616 | A1 | 1/2017 | Davies et al. |
| 2017/0137112 | A1 | 5/2017 | Winkelmann et al. |
| 2017/0321804 | A1* | 11/2017 | Soman ................... F16J 15/122 |
| 2017/0355436 | A1 | 12/2017 | Thompson et al. |
| 2018/0099735 | A1* | 4/2018 | Kelly ....................... B64C 3/56 |
| 2022/0024558 | A1 | 1/2022 | Horwood et al. |

OTHER PUBLICATIONS

Extended European Search Report for corresponding European Patent Application No. 24167108.0 dated Sep. 23, 2024.
United Kingdom Search Report for corresponding United Kingdom Patent Application No. 2306216.9 dated Sep. 21, 2023.

* cited by examiner

*Primary Examiner* — Rodney A Bonnette
(74) *Attorney, Agent, or Firm* — Greer, Burns & Crain, Ltd.

(57) ABSTRACT

A seal between two aircraft surfaces which are able to move relative to each other. A wing tip device moves between a flight configuration and a ground configuration, in which ground configuration the wing tip device is moved away from the fixed wing such that the span of the aircraft wing is reduced. The fixed wing and wing tip device each comprise an outer surface, and a male seal and female seal are arranged such that when the wing tip device is in the flight configuration the female seal receives the male seal, and the female seal and male seal cooperate to provide a smooth transition from the fixed wing outer surface to the wing tip device outer surface.

16 Claims, 6 Drawing Sheets

SEAL

CROSS-REFERENCES TO RELATED APPLICATIONS

This application claims the benefit of Great Britain Patent Application No. 2306216.9 filed on Apr. 27, 2023, the entire disclosure of which is incorporated herein by way of reference.

BACKGROUND OF THE INVENTION

The present invention concerns a seal. More particularly, but not exclusively, this invention concerns an aircraft comprising a seal. The invention also concerns a folding wing tip comprising a seal.

Many components on an aircraft may move relative to one or more adjacent components. For example, an aircraft comprising a wing with a folding wing tip includes a fixed wing section, and a moveable wing tip device, which may be deployed in a flight position and also a ground position. In the flight position, it is desirable to reduce or remove gaps between the fixed wing section and the wing tip device, which would otherwise disrupt airflow over the wing. Typically a blade seal may be positioned to cover the gap, but such seals may not provide the optimum sealing performance, for example being difficult to shape correctly to provide a good seal, and/or being vulnerable to freezing during flight, with the potential for seal damage to occur when a folding wing tip is moved from the flight position to the ground position once the aircraft has landed.

The present invention seeks to mitigate one or more of the above-mentioned problems. Alternatively or additionally, the present invention seeks to provide an improved aircraft seal.

SUMMARY OF THE INVENTION

The present invention provides, according to a first aspect, an aircraft comprising an aircraft wing, the aircraft wing comprising a fixed wing and a wing tip device at the tip thereof, wherein the wing tip device is configurable between: (i) a flight configuration for use during flight and (ii) a ground configuration for use during ground-based operations, in which ground configuration the wing tip device is moved away from the flight configuration such that the span of the aircraft wing is reduced, wherein the fixed wing comprises a fixed wing outer surface and the wing tip device comprises a wing tip device outer surface, wherein fixed wing comprises a female seal and the wing tip device comprises a male seal, such that when the wing tip device is in the flight configuration the female seal receives the male seal, and the female seal and male seal cooperate to provide a smooth transition from the fixed wing outer surface to the wing tip device outer surface.

The aircraft wing may comprise a hinge arrangement connecting the fixed wing and the wing tip device. The hinge arrangement may be located within a wing box of the aircraft wing, for example within a wing box of the fixed wing. The hinge arrangement may be located inboard of the male seal and the female seal. The wing tip device may be arranged to move between the flight configuration and the ground configuration by rotation around the hinge arrangement.

The male seal and the female seal may comprise materials of different stiffness. For example, the male seal may be stiffer than the female seal. The female seal may be resiliently deformable, such that when the wing tip device is in the flight configuration, the female seal is compressed by, and deformed by, the male seal. The compression of the female seal may bias the female seal against the male seal, such that when the wing tip device moves to the ground configuration, separation of the male seal and the female seal is encouraged. The female seal may comprise one or more cavities which allow for deformation of the female seal when compressed by the male seal. The one or more cavities may run along the longitudinal length of the seal. The male seal and the female seal may comprise the same material, with the structure of the female seal arranged such that the female seal is less stiff than the male seal. For example, material may be removed from the female seal to reduce the stiffness of the female seal. In an alternative arrangement, the female seal may be stiffer than the male seal.

The male seal and/or female seal may comprise a heating element. The heating element may comprise a wire though which a current may pass to produce heat. The heating element may comprise a channel containing heated fluid. The heating element may prevent the male seal from freezing to the female seal, and/or may be used to defrost frozen seals.

The male seal and the female seal may meet along respective engagement faces when the wing tip device is in the flight configuration. The engagement face of the male seal and/or the engagement face of the female seal may comprise a low friction material. Such an arrangement may encourage the easy separation of the male seal and the female seal when the wing tip device moves to the ground configuration. The engagement face of the male seal and the engagement face of the female seal may meet in a linear plane, a curved plane and/or a twisted plane. The angle and orientation of the plane may be chosen to encourage the male seal and female seal to separate when the wing tip device moves from the flight configuration to the ground configuration. For example, the angle and orientation of the plane may be chosen with respect to a hinge axis of the hinge arrangement such that as the wing tip device moves from the flight configuration to the ground configuration, the male seal moves away from the female seal with at least some component of movement perpendicular to the plane. This arrangement means that the male seal does not slide across the female seal during movement of the wing tip device from the flight configuration to the ground configuration. Instead the male seal moves away from the female seal, thus encouraging easy separation of the male seal and female seal.

The angle and orientation of the engagement faces of the male seal and the female seal may be chosen such that as the wing tip device moves from the flight configuration to the ground configuration, a first portion of the male seal and first portion of the female seal separate from one another before other portions of the male seal and female seal. This peeling of the male seal away from the female seal may encourage easy separation of the male seal and female seal. Such an arrangement may reduce the likelihood of damage to the male seal and/or female seal, by reducing the potential loads on the seals during separation. Such an arrangement may also assist in the correct location of the male seal relative to the female seal when the wing tip device moves from the ground configuration to the flight configuration.

The male seal may be removably connected to the wing tip device. For example, the male seal may be connected to the wing tip device by removable fasteners, such as bolts, screws, or clips. The male seal may comprise a flange through which removable fasteners may be passed to allow removable connection of the male seal to the wing tip device. Removal of the fasteners may allow the straightforward replacement of the male seal, should the male seal become damaged or worn. The female seal may be removably connected to the fixed wing. For example, the female seal may be connected to the fixed wing by removable fasteners, such as bolts, screws, or clips. The female seal may comprise a flange through which removable fasteners may be passed to allow removable connection of the female wing to the fixed wing. Removal of the fasteners may allow the straightforward replacement of the female seal, should the female seal become damaged or worn.

The male seal and female seal may be located at the upper side of the aircraft wing. The male seal and female seal may be located at the lower side of the aircraft wing. The male seal may be positioned to provide a continuation of the outer mold line of the wing tip device. The female seal may be positioned to provide a continuation of the outer mold line of the fixed wing. When the wing tip device is in the flight configuration, the male seal and female seal may provide a smooth continuation of the outer mold line of the wing tip device to the outer mold line of the fixed wing. The male seal and female seal may extend in a substantially line of flight direction, for example from towards the front of the wing to the rear of the wing. The male seal and female seal may extend in a direction angled to the line of flight direction. The male seal and female seal may extend in a first direction and a second direction, for example the first direction may be aligned with the line of flight direction, and the second direction may extend at an angle to the line of flight direction, there being a kink in the male seal and female seal at the point at which the direction changes.

In an alternative embodiment of the invention, there is provided an aircraft wing comprising a fixed wing and a wing tip device at the tip thereof, wherein the wing tip device is configurable between: (i) a flight configuration for use during flight and (ii) a ground configuration for use during ground-based operations, in which ground configuration the wing tip device is moved away from the flight configuration such that the span of the aircraft wing is reduced, wherein the fixed wing comprises a fixed wing outer surface and the wing tip device comprises a wing tip device outer surface, wherein fixed wing comprises a female seal and the wing tip device comprises a male seal, such that when the wing tip device is in the flight configuration the female seal receives the male seal, and the female seal and male seal cooperate to provide a smooth transition from the fixed wing outer surface to the wing tip device outer surface.

In an alternative embodiment of the invention, there is provided a first aircraft surface and a second aircraft surface, wherein the first aircraft surface comprises a male seal and the second aircraft surface comprises a female seal, wherein the female seal receives the male seal, and the female seal and male seal cooperate to provide a smooth transition from the first aircraft surface to the second aircraft surface.

The first aircraft surface may be configured to move relative to the second aircraft surface. For example, the first aircraft surface may comprise a door or access hatch and the second aircraft surface may comprise a door opening or aperture covered by the access hatch. The first surface may have a closed position relative to the second aircraft surface, and the male seal and female seal may provide a smooth transition from the first aircraft surface to the second aircraft surface when the first surface is in the closed position.

In an alternative embodiment of the invention, there is provided a male seal and a female seal, the male seal arranged to be received by the female seal, wherein the male seal comprises a stiffer material than the female seal. In an alternative arrangement, the female seal may be stiffer than the male seal.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft may be a commercial aircraft, for example a commercial passenger aircraft, for example a single aisle or twin aisle aircraft.

It will of course be appreciated that features described in relation to one aspect of the present invention may be incorporated into other aspects of the present invention. For example, the first aspect of the invention may incorporate any of the features described with reference to the any other aspects of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
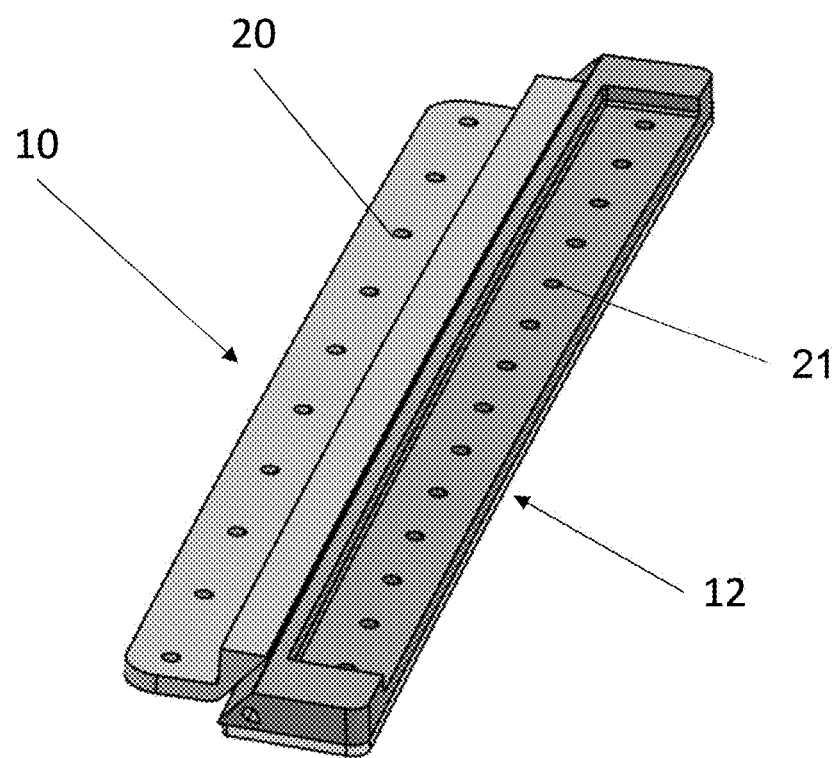
FIG. 1 shows a schematic view of a male seal and female seal according to an embodiment of the invention.
Figure 2:
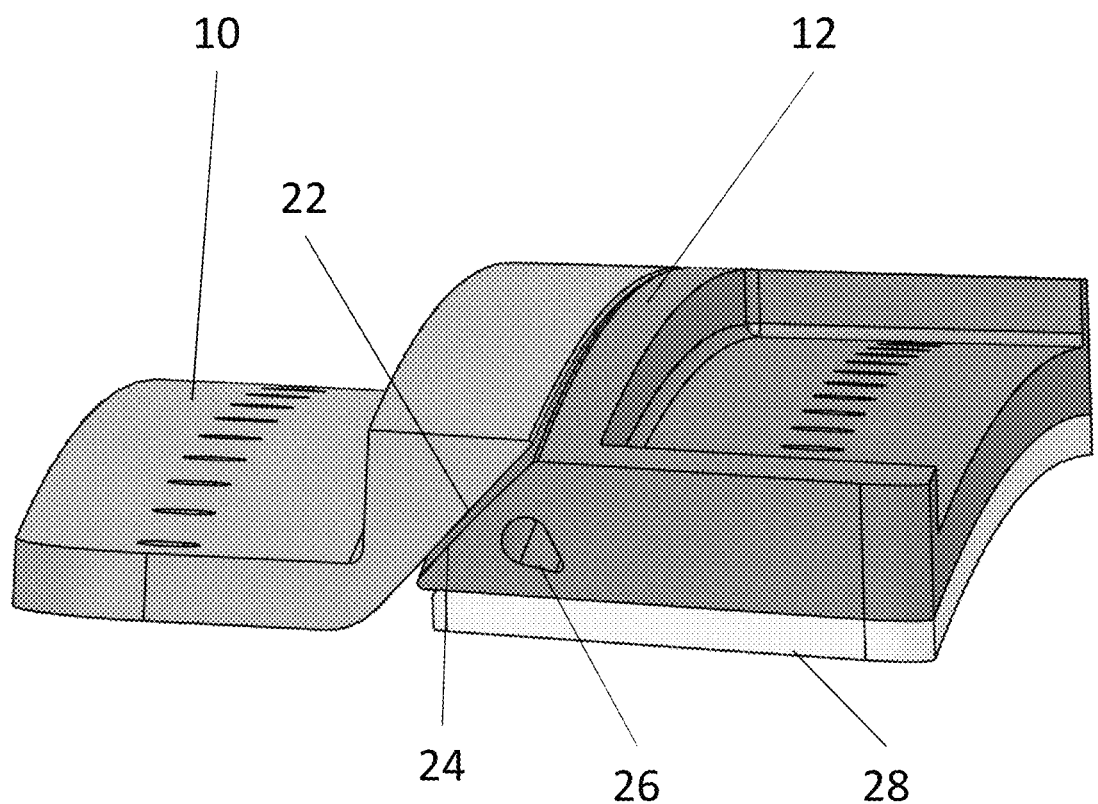
FIG. 2 shows a side view of the seals shown in FIG. 1.
Figure 3:
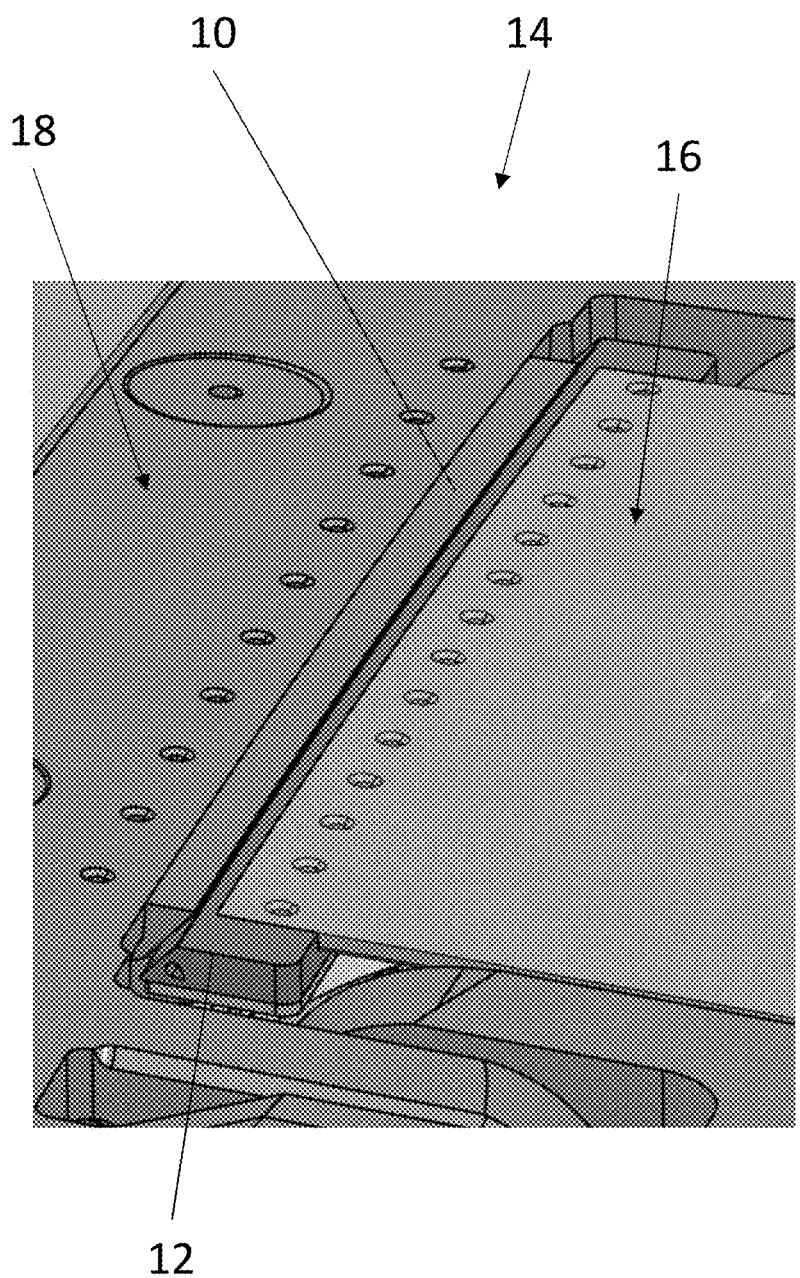
FIG. 3 shows the male seal and female seal shown in FIGS. 1 and 2 in place on an aircraft wing according to an embodiment of the invention.

FIGS. 1 and 2 show a male seal 10 and a female seal 12, with FIG. 3 showing the male seal 10 and female seal 12 installed on an aircraft wing 14 comprising a fixed wing 16 and a folding wing tip device 18. The male seal 10 comprises a flange 20 which includes a series of apertures through which removable fasteners, such as screws or bolts, may pass in order to removably connect the male seal 10 to the wing tip device 18. The female seal 12 comprises a flange 21 which includes a series of apertures through which removable fasteners, such as screws or bolts, may pass in order to removably connect the female seal 12 to the fixed wing 16. The aircraft wing 14 is configurable between a flight configuration for use during flight, and a ground configuration for use on the ground. In the ground configuration, the folding wing tip device 18 is moved around a hinge oriented approximately in the line of flight direction, such that the span of the aircraft wing 14 is reduced.

The male seal 10 comprises a stiffer material than the female seal 12, and the materials for the male seal 10 and female seal 12 may be chosen from any suitable plastic, rubber, elastomeric, or other material as will be well known to the person skilled in the art.

The female seal 12 comprises a cavity 26 which runs through the female seal 12 and allows for the deformation of the female seal 12 when the wing tip device 18 is in the flight configuration. This provides a good seal between the male seal 10 and the female seal 12. The female seal 12 comprises a resiliently deformable material, such that when the female seal 12 is compressed by the male seal 10 when the wing tip device 18 is in the flight configuration, there is a biasing force between the male seal 10 and the female seal 12. This biasing force provides a good seal between the male seal 10 and the female seal 12, and also encourages easy disengagement of the male seal 10 and the female seal 12 when the wing tip device 18 is moved to the ground configuration. The female seal 12 comprises a stiffening strip 28 located along the base of the female seal 12, to ensure that whilst the female seal 12 is compressed by the male seal 10 when in the flight configuration, the female seal 12 retains enough structural integrity to provide a good seal with the male seal 10.

The male seal 10 and the female seal 12 comprise respective engagement faces 22 and 24, which when the wing tip device 18 is in the flight configuration, abut one another. In one embodiment of the invention, one or both of the engagement faces 22 and 24 are coated with a low-friction material, which allows for easy disengagement of the engagement faces 22 and 24. In another embodiment of the invention, the male seal 10 and/or female seal 12 comprise materials that are low-friction, which allows for easy disengagement of the engagement faces 22 and 24.

Figure 4:
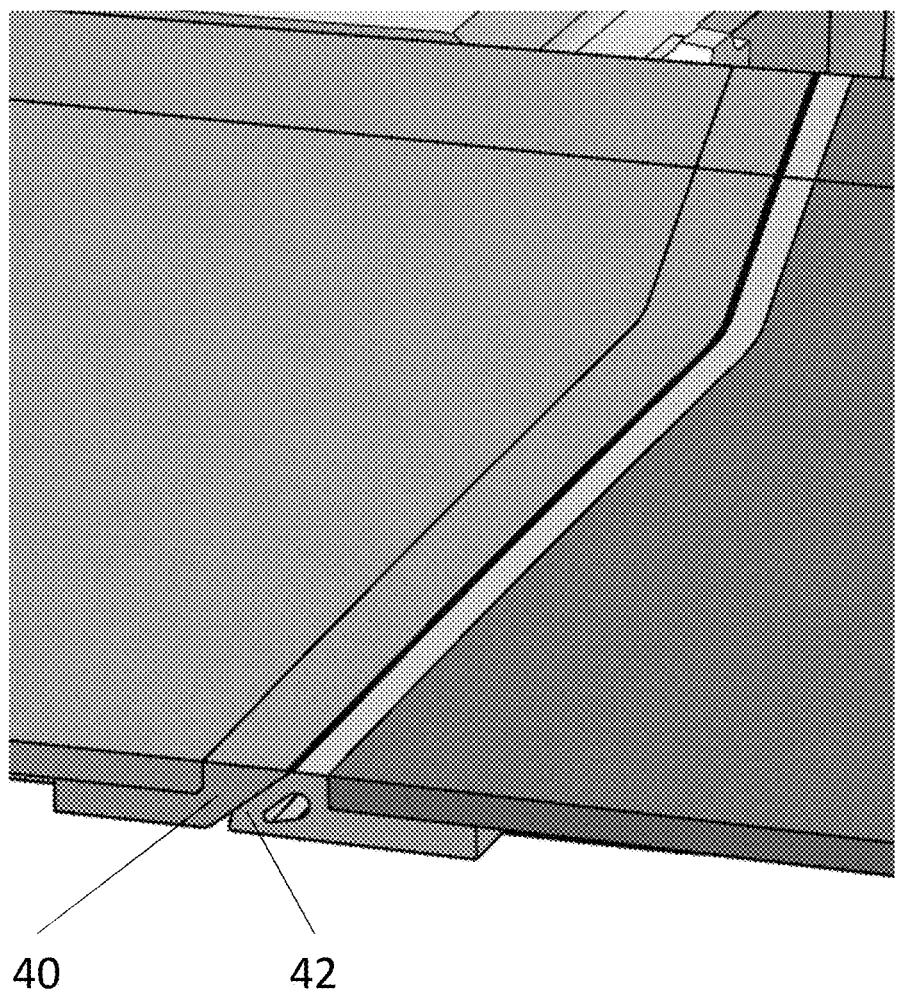
FIG. 4 shows an aircraft wing according to an alternative embodiment of the invention.

As can be seen in FIG. 3, when the folding wing tip device 18 is in the flight configuration, the male seal 10 and female seal 12 cover the gap between the fixed wing 16 and the wing tip device 18, such that a smooth and continuous surface is provided between the outer surface of the fixed wing 16 and the outer surface of the wing tip device 18. As can be seen, the male seal 10 has a top surface which is approximately coplanar with the upper mold line of the wing tip device 18, and the female seal 12 has a top surface which is approximately coplanar with the upper mold line of the fixed wing 16. This will ensure a smooth airflow over the join between fixed wing 16 and the wing tip device 18, and also prevent any foreign objects from entering the gap between the fixed wing 16 and the wing tip device 18 when in the flight configuration. In FIG. 3, the male seal 10 and female seal 12 extend in a line of flight direction, which is approximately parallel to the hinge around which the wing tip device 18 is moved around when moving between the flight configuration and ground configuration. FIG. 4 shows an alternative embodiment, where a similar male seal 40 and female seal 42 are configured to cover a gap which extends in a first direction and a second direction. The male seal 40 and female seal 42 extend in those two directions, with a kink at the point where the first direction changes to the second direction. Whilst not shown in the figures, the skilled person will appreciate that a male seal and a female seal may extend in a curved direction when covering a gap which extends in a similarly curved direction.

Figure 5:
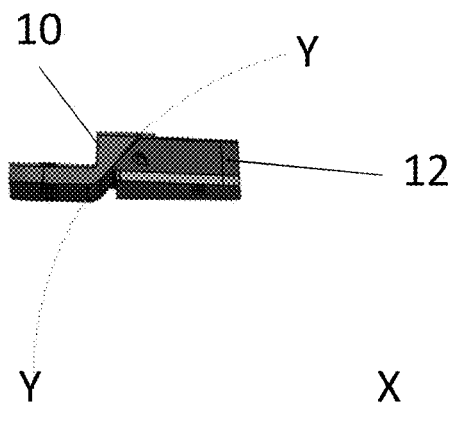
FIG. 5 shows a first stage of the movement of the male seal and female seal of FIGS. 1 and 2 towards and apart from each other.
Figure 6:
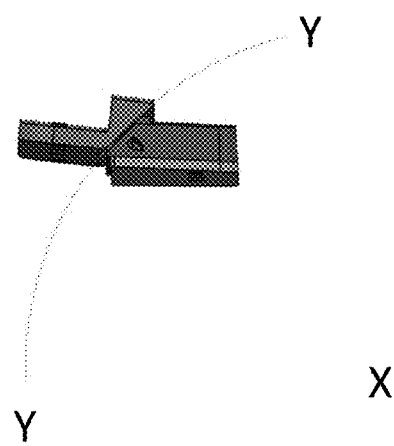
FIG. 6 shows a second stage of the movement of the male seal and female seal of FIGS. 1 and 2 towards and apart from each other.
Figure 7:
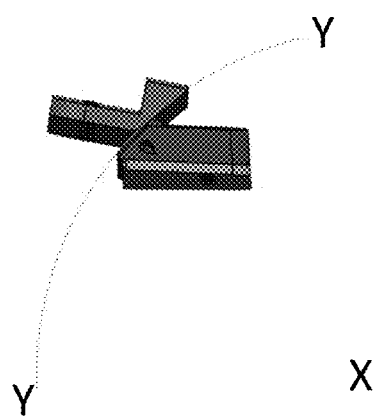
FIG. 7 shows a third stage of the movement of the male seal and female seal of FIGS. 1 and 2 towards and apart from each other.
Figure 8:
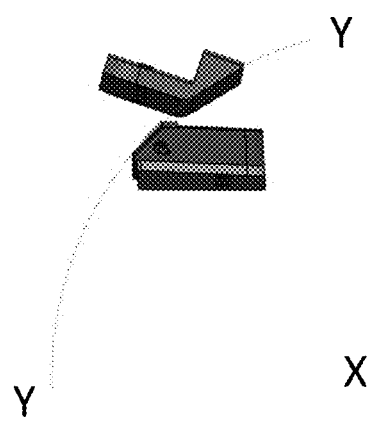
FIG. 8 shows a fourth stage of the movement of the male seal and female seal of FIGS. 1 and 2 towards and apart from each other.

FIGS. 5 to 8 show a side view of the movement of the male seal 10 in relation to the female seal 12 when the wing tip device 18 moves from the flight configuration towards the ground configuration. FIG. 5 shows the male seal 10 and female seal 12 when the wing tip device 18 is in the flight configuration. The hinge line is shown by the axis X, and the wing tip device is rotated around the axis X when moving between the flight configuration and the ground configuration. The line Y-Y indicates the arc traced by the edge of the wing tip device 18. As can be seen, the engagement face 22 of the male seal 10 and the engagement face 24 of the female seal 12, are close to being tangential to the arc Y-Y, but slightly angled so that sliding of the engagement faces 22, 24, across one another is reduced during the movement. This arrangement promotes easy separation of the male seal 10 and female seal 12, and the peeling of the two seals apart from one another may reduce the likelihood of the seals being damaged during use. The movement may also reduce the likelihood of the male seal 10 and female seal 12 being frozen together in cold weather conditions to a point which prevents the seals from being separated. As can be seen in FIGS. 6 to 8, only a small degree of angular movement of the wing tip device is required to remove the contact between the male seal 10 and female seal 12.

Figure 9:
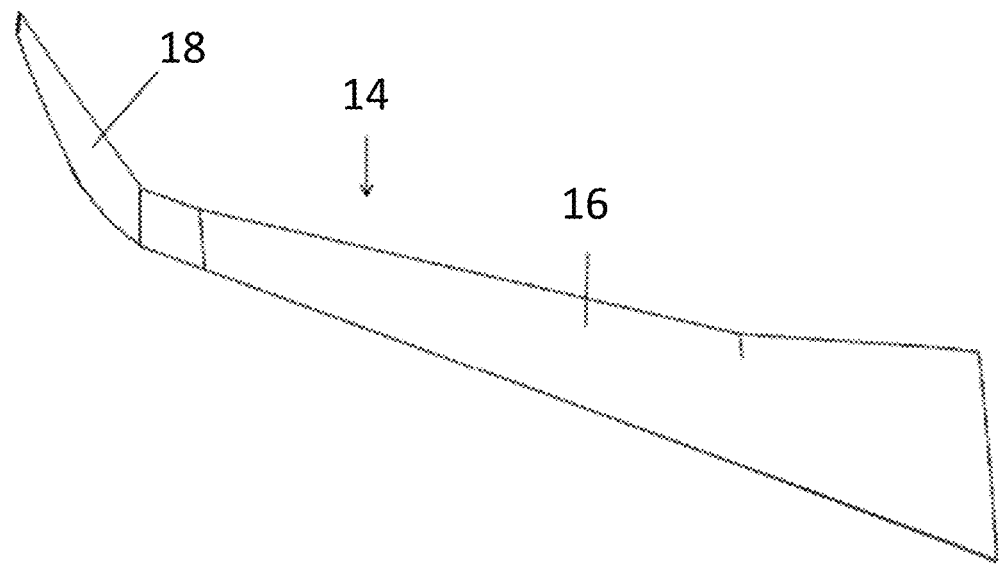
FIG. 9 shows an aircraft wing according to an embodiment of the invention.

FIG. 9 shows a full view of the aircraft wing 14 comprising the fixed wing 16, and the wing tip device 18. In this figure, the wing tip device 18 is shown in the ground configuration, where the wing tip device 18 has been moved away from the flight configuration and the wing span of the wing 14 reduced. In this position the male seal 10 and the female seal 12 will no longer be in contact with each other.

Figure 10:
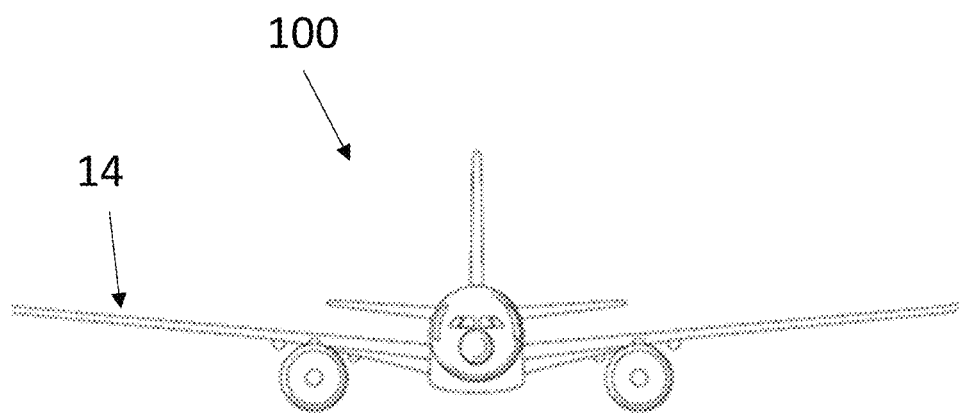
FIG. 10 shows an aircraft according to an embodiment of the invention.

FIG. 10 shows an aircraft 100 comprising aircraft wings as shown in FIG. 9.

Whilst the present invention has been described and illustrated with reference to particular embodiments, it will be appreciated by those of ordinary skill in the art that the invention lends itself to many different variations not specifically illustrated herein. By way of example only, certain possible variations will now be described. The male seal and/or the female seal may comprise one or more embedded heating elements. Such elements may take the form of wires through which an electrical current may be run. The heating element or elements may be used to prevent the male seal and female seal from freezing to each other, or may be used to defrost the male seal and female seal if the two seals freeze to one another. Alternative heating elements may be used, for example the male seal or female seal may comprise a channel through which a heated fluid may be passed. The male seal and female seal have been shown on the upper surface of an aircraft wing, but the skilled person will appreciate that the male seal and female seal may also be applied at a join at the lower surface of an aircraft wing.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft comprising:
    an aircraft wing, the aircraft wing comprising a fixed wing and a wing tip device at a tip thereof, wherein the wing tip device is configured to move between: (i) a flight configuration for use during flight; and (ii) a ground configuration for use during ground-based operations,
wherein in the ground configuration the wing tip device is moved away from the flight configuration such that a span of the aircraft wing is reduced,
wherein the fixed wing comprises a fixed wing outer surface and the wing tip device comprises a wing tip device outer surface,
wherein fixed wing comprises a female seal and the wing tip device comprises a male seal, such that when the wing tip device is in the flight configuration the female seal receives the male seal, and the female seal and male seal cooperate to provide a smooth transition from the fixed wing outer surface to the wing tip device outer surface,
wherein the wing tip device rotates about a hinge line in relation to the fixed wing,
wherein the male seal and the female seal meet along respective engagement faces of the male seal and the female seal when the wing tip device is in the flight configuration, and
wherein the respective engagement faces are spaced radially outwardly from the hinge line when the wing tip is in the flight configuration and the ground configuration.

2. The aircraft as claimed in claim 1, wherein the aircraft wing comprises a hinge arrangement connecting the fixed wing and the wing tip device.

3. The aircraft as claimed in claim 1, wherein the male seal and the female seal comprise materials of different stiffness.

4. The aircraft as claimed in claim 1, wherein the male seal is stiffer than the female seal.

5. The aircraft as claimed in claim 1, wherein the female seal is resiliently deformable, such that when the wing tip device is in the flight configuration, the female seal is compressed by, and deformed by, the male seal.

6. The aircraft as claimed in claim 1, wherein the female seal comprises one or more cavities which allow for deformation of the female seal when compressed by the male seal.

7. The aircraft as claimed in claim 6, wherein the one or more cavities run along a longitudinal length of the female seal.

8. The aircraft as claimed in claim 1, wherein the respective engagement faces are free from contact along entire lengths of the respective engagement surfaces when the wing tip device is in the ground configuration.

9. The aircraft as claimed in claim 1 wherein the smooth transition extends in a direction of flight.

10. The aircraft as claimed in claim 1, wherein an engagement face of the male seal, or an engagement face of the female seal, or both comprise a low friction material.

11. The aircraft as claimed in claim 1, wherein the engagement face of the male seal and the engagement face of the female seal meet in a linear plane, a curved plane, a twisted plane, or combination thereof, and
wherein an angle and an orientation of the linear plane, the curved plane, the twisted plane, or the combination thereof is such that as the wing tip device moves from the flight configuration to the ground configuration, the male seal moves away from the female seal with at least some component of movement perpendicular to the linear plane, the curved plane, the twisted plane, or the combination thereof.

12. The aircraft as claimed in claim 1, wherein the male seal is removably connected to the wing tip device.

13. The aircraft as claimed in claim 1, wherein the female seal is removably connected to the fixed wing.

14. An arrangement comprising:
a first aircraft surface, and
a second aircraft surface,
wherein the first aircraft surface comprises a male seal and the second aircraft surface comprises a female seal,
wherein the female seal receives the male seal,
wherein the female seal and male seal cooperate to provide a smooth transition from the first aircraft surface to the second aircraft surface,
wherein the first aircraft surface and the second aircraft surface are rotate in relation to each other about a hinge line,
wherein the male seal and the female seal meet along respective engagement faces of the male seal and the female seal when the first aircraft surface and the second aircraft surface are rotated to a flight configuration, and
wherein the respective engagement faces are spaced radially outwardly from the hinge line when the first aircraft surface and the second aircraft surface are rotated to a flight configuration and a ground configuration.

15. The arrangement as claimed in claim 14, wherein the male seal is stiffer than the female seal.

16. An aircraft wing comprising:
a fixed wing and a wing tip device at a tip thereof,
wherein the wing tip device is configured to move between: (i) a flight configuration for use during flight and (ii) a ground configuration for use during ground-based operations,
wherein in the ground configuration the wing tip device is moved away from the flight configuration such that a span of the aircraft wing is reduced,
wherein the fixed wing comprises a fixed wing outer surface and the wing tip device comprises a wing tip device outer surface,
wherein fixed wing comprises a female seal and the wing tip device comprises a male seal, such that when the wing tip device is in the flight configuration the female seal receives the male seal, and the female seal and male seal cooperate to provide a smooth transition from the fixed wing outer surface to the wing tip device outer surface,
wherein the wing tip device rotates about a hinge line in relation to the fixed wing,
wherein the male seal and the female seal meet along respective engagement faces of the male seal and the female seal when the wing tip device is in the flight configuration, and
wherein the respective engagement faces are spaced radially outwardly from the hinge line when the wing tip is in the flight configuration and the ground configuration.

* * * * *